United States Patent
Snyder

(10) Patent No.: US 12,430,754 B2
(45) Date of Patent: Sep. 30, 2025

(54) SYSTEMS, METHODS, AND DEVICES FOR DETECTING ANATOMICAL FEATURES

(71) Applicant: Medtronic Navigation, Inc., Louisville, CO (US)

(72) Inventor: Victor D. Snyder, Erie, CO (US)

(73) Assignee: Medtronic Navigation, Inc., Louisville, CO (US)

(*) Notice: Subject to any disclaimer, the term of this patent is extended or adjusted under 35 U.S.C. 154(b) by 535 days.

(21) Appl. No.: 17/800,743

(22) PCT Filed: May 3, 2021

(86) PCT No.: PCT/US2021/030409
§ 371 (c)(1),
(2) Date: Aug. 18, 2022

(87) PCT Pub. No.: WO2021/225931
PCT Pub. Date: Nov. 11, 2021

(65) Prior Publication Data
US 2023/0097365 A1    Mar. 30, 2023

Related U.S. Application Data

(60) Provisional application No. 63/019,822, filed on May 4, 2020.

(51) Int. Cl.
*G06T 7/00* (2017.01)
*G06T 5/20* (2006.01)
(Continued)

(52) U.S. Cl.
CPC .............. *G06T 7/0012* (2013.01); *G06T 5/20* (2013.01); *G06T 7/13* (2017.01); *G06T 7/60* (2013.01);
(Continued)

(58) Field of Classification Search
CPC . G06T 2207/30012; G06T 2207/10081; G06T 2207/10088; G06T 7/60;
(Continued)

(56) References Cited

U.S. PATENT DOCUMENTS 6,608,917 B1   8/2003   Wei et al.
7,046,830 B2   5/2006   Gerard et al.
(Continued)

FOREIGN PATENT DOCUMENTS

WO   WO 2019/079778   4/2019

OTHER PUBLICATIONS

Benameur et al. "3D/2D registration and segmentation of scoliotic vertebrae using statistical models," Computerized Medical Imaging and Graphics, Sep.-Oct. 2003, vol. 27, No. 5, pp. 321-337.
(Continued)

*Primary Examiner* — Ajibola A Akinyemi
(74) *Attorney, Agent, or Firm* — Sheridan Ross P.C.

(57) ABSTRACT

A method of detecting a vertebral endplate rim according to embodiments of the present disclosure includes receiving, at a processor, a binary mask of a vertebra; applying a Laplacian filter to the binary mask to yield a processed image; identifying, in the processed image, a set of edges having a sharpness that exceeds a predetermined threshold; deformably registering a template to a plurality of points corresponding to at least some of the edges in the set of edges; excluding some of the plurality of points based on at least one predetermined criterion; and generating additional points by interpolating among a remaining subset of the plurality of points to yield a set of points defining an endplate rim of the vertebra.

21 Claims, 8 Drawing Sheets

(51) Int. Cl.
*G06T 7/13* (2017.01)
*G06T 7/60* (2017.01)
*G06V 10/75* (2022.01)

(52) U.S. Cl.
CPC .. *G06V 10/751* (2022.01); *G06T 2207/30012* (2013.01)

(58) Field of Classification Search
CPC . G06T 2207/10116; G06T 2207/10121; G06T 2207/10136; G06T 7/174; G06T 7/38; G06T 7/11; G06T 2207/10072; G06T 2207/10132
USPC ........................................................ 382/128
See application file for complete search history.

(56) References Cited

U.S. PATENT DOCUMENTS

| | | | |
|---|---|---|---|
| 7,885,441 B2 | 2/2011 | Node-Langlois et al. | |
| 8,014,625 B2 | 9/2011 | Dewaele | |
| 8,676,298 B2 | 3/2014 | Wang et al. | |
| 8,724,865 B2 | 5/2014 | Hipp et al. | |
| 10,178,982 B2 | 1/2019 | Behrooz et al. | |
| 2009/0182429 A1* | 7/2009 | Humphreys | A61F 2/442 606/301 |
| 2015/0356729 A1 | 12/2015 | Hladuvka et al. | |
| 2017/0020630 A1 | 1/2017 | Johnson et al. | |
| 2017/0165008 A1 | 6/2017 | Finley | |
| 2017/0273614 A1 | 9/2017 | Giphart et al. | |
| 2021/0358128 A1* | 11/2021 | Behrooz | G06T 7/11 |

OTHER PUBLICATIONS

International Search Report for PCT/US2021/030409 date of completion is Jul. 29, 2021 (3 pages).

Junhua Zhang et al, "Automatic Cobb Measurement of Scoliosis Based on Fuzzy Hough Transform with Vertebral Shape Prior", Journal of Digital Imaging ; The Journal of the Society for Computer Applications in Radiology, Springer-Verlag, NE, (May 31, 2008), vol. 22, No. 5, ISSN 1618-727X, pp. 463-472, XP019725646 [I] 1-10, 17-21 * p. 463-p. 468 * [A] 11-16.

Junhua Zhang et al, "Computer-aided assessment of scoliosis on posteroanterior radiographs", Medical & Biological Engineering & Computing, Springer, Berlin, DE, (Dec. 10, 2009), vol. 48, No. 2, ISSN 1741-0444, pp. 185-195, XP019835459 [A] 1-21 * p. 186-p. 191.

Huynh T N et al, "Development of a Vertebral Endplate 3-D Reconstruction Technique", IEEE Transactions on Medical Imaging, IEEE Service Center, Piscataway, NJ, US, (Oct. 1997), vol. 16, No. 5, doi:10.1109/42.640760, ISSN 0278-0062, pp. 689-696, XP000722563 [A] 1-21 * p. 690-p. 691 *.

International Preliminary Report on Patentability for International (PCT) Patent Application No. PCT/US2021/030409, dated Nov. 17, 2022 11 pages.

* cited by examiner

SYSTEMS, METHODS, AND DEVICES FOR DETECTING ANATOMICAL FEATURES

CROSS-REFERENCE TO RELATED APPLICATIONS

This application is a National Stage Application of PCT/US2021/030409 filed May 3, 2021, which claims benefit of and priority to U.S. Provisional Application No. 63/019,822, filed May 4, 2020, and the disclosures of each of the above-identified applications are hereby incorporated by reference in their entirety.

FIELD

The present technology is related generally to medical imaging, and is more particularly related to detection of vertebral endplate rims or other anatomical features in medical images.

BACKGROUND

Clinically meaningful measurements of anatomical structures may be important for planning a surgical procedure. For example, for spinal procedures, measurement of the spinal anatomy (including, for example, disc height measurements and Cobb angles useful for assessing scoliosis or sagittal alignment) may be used in planning a spinal procedure. In addition, surgical planning is increasingly done using 3D datasets, such as those generated by CT or MRI scans.

SUMMARY

A system for identifying vertebral endplate rims according to one embodiment of the present disclosure comprises: a communication interface; a processor; and a memory. The memory stores instructions for execution by the processor that, when executed, cause the processor to: receive a binary mask of a 3D image of a vertebra; identify a set of edges of the vertebra based on a determined change of gradient direction; categorize each edge of the set of edges as a plausible edge or an implausible edge; reject the implausible edges; select a plurality of points based on the plausible edges; and generate additional points by interpolating between adjacent ones of at least some of the plurality of points to fill in gaps between the at least some of the plurality of points.

The memory may store additional instructions for execution by the processor that, when executed, cause the processor to output coordinates of a vertebral endplate rim. The memory may store additional instructions for execution by the processor that, when executed, cause the processor to fit a template to the set of edges. Categorizing each edge of the set of edges may comprise comparing a location of each of a plurality of fitted points on the template to at least two adjacent fitted points on the template. Categorizing each edge of the set of edges may comprise categorizing any edge that extends more than a predetermined distance from the template as implausible.

Identifying the set of edges may comprise applying a Laplacian filter to the binary mask. Identifying the set of edges may comprise identifying changes of gradient direction that exceed a predetermined magnitude. The implausible edges may be those with a length in a superior-inferior direction that is greater by at least a predetermined amount than each of a length in an anterior-posterior direction and a length in a lateral direction. The additional points may be generated by interpolating at regular intervals.

A method of detecting a vertebral endplate rim according to another embodiment of the present disclosure comprises: receiving, at a processor, a binary mask of a vertebra; applying a Laplacian filter to the binary mask to yield a processed image; identifying, in the processed image, a set of edges having a sharpness that exceeds a predetermined threshold; deformably registering a template to a plurality of points corresponding to at least some of the edges in the set of edges; excluding some of the plurality of points based on at least one predetermined criterion; and generating additional points by interpolating among a remaining subset of the plurality of points to yield a set of points defining an endplate rim of the vertebra.

The at least one predetermined criterion may comprise whether a point from the plurality of points is beyond a predetermined distance from a subset of the plurality of points. The at least one predetermined criterion may comprise whether a point from the plurality of points defines a contour that exceeds a predetermined sharpness. The at least one predetermined criterion may comprise whether the point is closer to a plane fitted to the template than an adjacent point. Each of the at least some of the edges in the set of edges may satisfy an edge criterion. The edge criterion may correspond to a dimension of an edge in a superior-inferior direction relative to each of a dimension of the edge in an anterior-posterior direction and a dimension of the edge in a lateral direction.

An image processing device according to another embodiment of the present disclosure comprises: a communication interface; a processor; and a memory. The memory stores instructions for execution by the processor that, when executed, cause the processor to: apply a Laplacian filter to a binary mask of a vertebra to yield a processed image, the binary mask received via the communication interface; identify a set of plausible edges using the processed image; register a template to a plurality of points, each of the plurality of points located on at least one plausible edge of the set of plausible edges; apply a predetermined criterion to each point of the plurality of points to yield a rejected set comprising points that do not satisfy the predetermined criterion and an accepted set comprising points that do satisfy the predetermined criterion; and generate at least one new point by interpolating between at least two points of the accepted set.

The memory may store additional instructions for execution by the processor that, when executed, further cause the processor to determine coordinates of an endplate rim of the vertebra based on at least the accepted set. In some embodiments, the processor does not use a machine learning algorithm in connection with any of the instructions. Each of the instructions may be executed by the processor automatically. The memory may store additional instructions for execution by the processor that, when executed, further cause the processor to fit a plane to the registered template. The predetermined criterion may be based on the fitted plane.

Although aspects of the disclosure are described in connection with the automatic detection of vertebral endplate rims, some embodiments of the present disclosure may be used to automatically detect anatomical structures other than vertebral endplate rims.

The details of one or more aspects of the disclosure are set forth in the accompanying drawings and the description below. Other features, objects, and advantages of the techniques described in this disclosure will be apparent from the description and drawings, and from the claims.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together. When each one of A, B, and C in the above expressions refers to an element, such as X, Y, and Z, or class of elements, such as $X_1$-$X_n$, $Y_1$-$Y_m$, and $Z_1$-$Z_o$, the phrase is intended to refer to a single element selected from X, Y, and Z, a combination of elements selected from the same class (e.g., $X_1$ and $X_2$) as well as a combination of elements selected from two or more classes (e.g., $Y_1$ and $Z_o$).

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The preceding is a simplified summary of the disclosure to provide an understanding of some aspects of the disclosure. This summary is neither an extensive nor exhaustive overview of the disclosure and its various aspects, embodiments, and configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and configurations of the disclosure are possible utilizing, alone or in combination, one or more of the features set forth above or described in detail below.

Numerous additional features and advantages of the present invention will become apparent to those skilled in the art upon consideration of the embodiment descriptions provided hereinbelow.

BRIEF DESCRIPTION OF THE DRAWINGS

The accompanying drawings are incorporated into and form a part of the specification to illustrate several examples of the present disclosure. These drawings, together with the description, explain the principles of the disclosure. The drawings simply illustrate preferred and alternative examples of how the disclosure can be made and used and are not to be construed as limiting the disclosure to only the illustrated and described examples. Further features and advantages will become apparent from the following, more detailed, description of the various aspects, embodiments, and configurations of the disclosure, as illustrated by the drawings referenced below.

DETAILED DESCRIPTION

Figure 1:
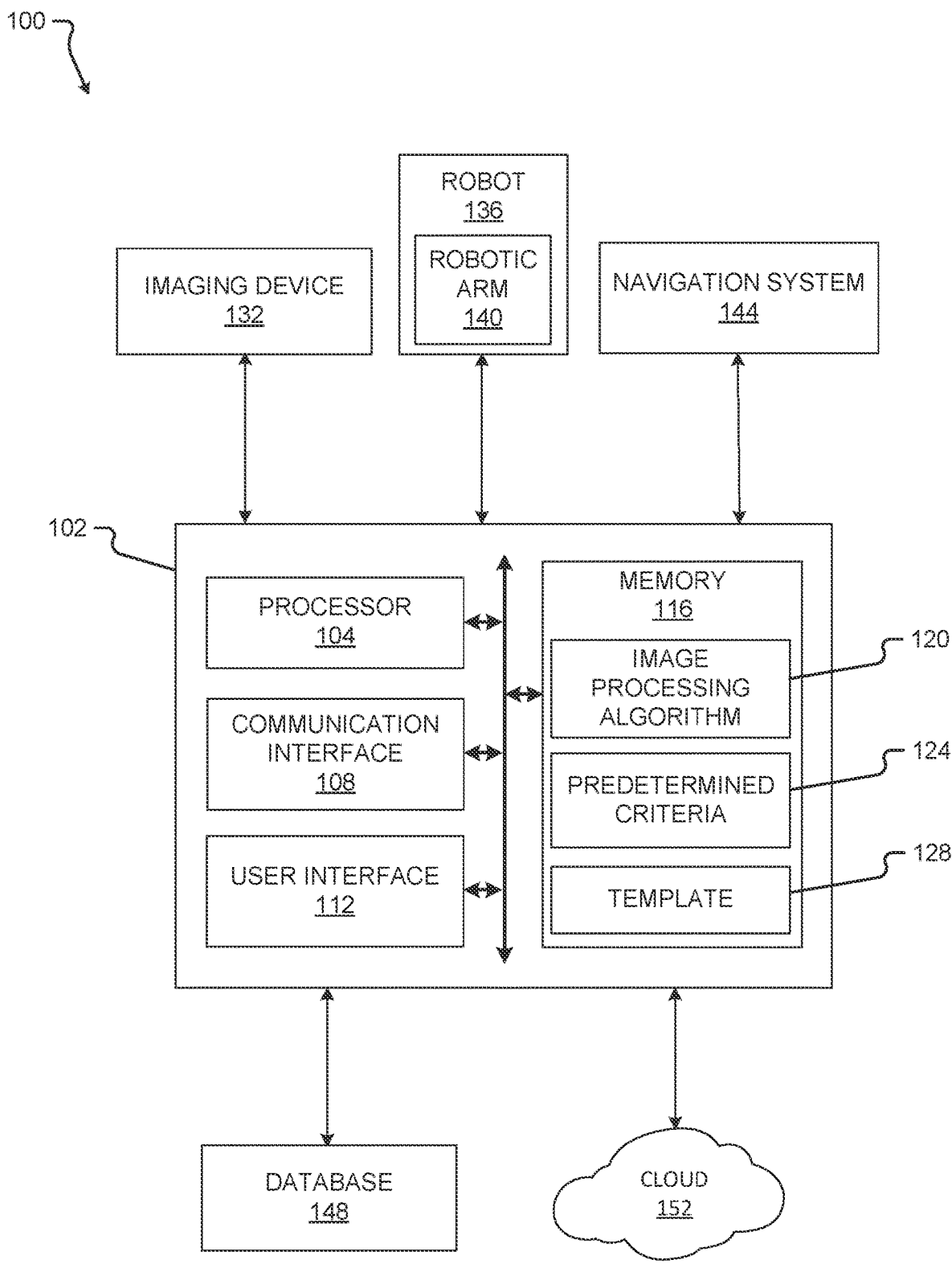
FIG. 1 is a block diagram of a system according to at least one embodiment of the present disclosure.

It should be understood that various aspects disclosed herein may be combined in different combinations than the combinations specifically presented in the description and accompanying drawings. It should also be understood that, depending on the example or embodiment, certain acts or events of any of the processes or methods described herein may be performed in a different sequence, and/or may be added, merged, or left out altogether (e.g., all described acts or events may not be necessary to carry out the disclosed techniques according to different embodiments of the present disclosure). In addition, while certain aspects of this disclosure are described as being performed by a single module or unit for purposes of clarity, it should be understood that the techniques of this disclosure may be performed by a combination of units or modules associated with, for example, a computing device and/or a medical device.

In one or more examples, the described methods, processes, and techniques may be implemented in hardware, software, firmware, or any combination thereof. If implemented in software, the functions may be stored as one or more instructions or code on a computer-readable medium and executed by a hardware-based processing unit. Computer-readable media may include non-transitory computer-readable media, which corresponds to a tangible medium such as data storage media (e.g., RAM, ROM, EEPROM, flash memory, or any other medium that can be used to store desired program code in the form of instructions or data structures and that can be accessed by a computer).

Instructions may be executed by one or more processors, such as one or more digital signal processors (DSPs), general purpose microprocessors (e.g., Intel Core i3, i5, i7, or i9 processors; Intel Celeron processors; Intel Xeon processors; Intel Pentium processors; AMD Ryzen processors; AMD Athlon processors; AMD Phenom processors; Apple A10 or 10X Fusion processors; Apple A11, A12, A12X, A12Z, or A13 Bionic processors; or any other general purpose microprocessors), application specific integrated circuits (ASICs), field programmable logic arrays (FPGAs), or other equivalent integrated or discrete logic circuitry. Accordingly, the term "processor" as used herein may refer to any of the foregoing structure or any other physical structure suitable for implementation of the described techniques. Also, the techniques could be fully implemented in one or more circuits or logic elements.

Before any embodiments of the disclosure are explained in detail, it is to be understood that the disclosure is not limited in its application to the details of construction and the arrangement of components set forth in the following description or illustrated in the drawings. The disclosure is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Further, the present disclosure may use examples to illustrate one or more aspects thereof. Unless explicitly stated otherwise, the use or listing of one or more examples (which may be denoted by "for example," "by way of example," "e.g.," "such as," or similar language) is not intended to and does not limit the scope of the present disclosure.

Embodiments of the present disclosure provide for automated measurements for anatomical structures, which enables more efficient surgical planning. Several embodiments discussed herein also facilitate intraoperative assessment of a spine (e.g., in conjunction with segmental tracking of each vertebra) or other anatomic structures. These embodiments offer several advantages over other possible approaches, including possible machine learning approaches. For example, embodiments of the present disclosure yield highly accurate results, may be completed intraoperatively, and do not require a significant investment (whether in terms of time, cost, processing power, or otherwise) in generating training data and debugging any failures in a machine learning algorithm.

Systems and methods according to embodiments of the present disclosure are useful for automatically detecting vertebral endplate rims or other anatomical structures. In particular, some embodiments of the present disclosure may be particularly well-suited for automatically detecting anatomical structures that: can be correctly segmented from an image (e.g., in the form of a binary mask, or in a form to which a binary filter may be applied to yield a binary mask); can be characterized by having or being the sharpest edge or change in a surface's local direction relative to surrounding structures; forms a reasonably smooth closed contour; and/or has a typical shape such that a template may be registered to it. Notably, embodiments of the present disclosure are not limited to the automatic detection of anatomical structures formed of bone. Some embodiments of the present disclosure also beneficially utilize changes in gradient direction, rather than an intensity gradient, to automatically detect anatomical structures, and therefore may be used, for example, even when an intensity gradient is insufficient to allow detection of anatomical structures.

As discussed below, these embodiments can achieve these and other results without using machine learning and its inherent limitations. Such systems and methods may be configured to receive a three-dimensional image or representation of a spine, spinal feature, or other anatomical structure (which image or representation may be, in some embodiments, a mask representing a segmentation of an original image) and, based on the image or representation, to: identify sharp edges at an appropriate length scale; reject implausible edges; select plausible edges; search for nearby anatomic points that might be included on an endplate rim; and close any gaps via interpolation, to yield a reasonably evenly distributed set of coordinates for describing the endplate rim.

Turning first to FIG. 1, a block diagram of a system 100 according to at least one embodiment of the present disclosure is shown. The system 100 may be used, for example, to carry out one or more aspect of one or more of the methods disclosed herein, to detect one or more vertebral endplate rims in a three-dimensional image, and/or to utilize one or more detected vertebral endplate rims in a three-dimensional image for or in connection with a surgical planning process, a registration process, segmental tracking (e.g., of one or more vertebral segments of a spine) during a surgical procedure, or for any other useful purpose. The system 100 comprises a computing device 102, one or more imaging devices 132, a robot 136, a navigation system 144, a database 148, and a cloud 152. Notwithstanding the foregoing, systems according to other embodiments of the present disclosure may omit any one or more of the one or more imaging devices 132, the robot 136, the navigation system 144, the database 148, and/or the cloud 152.

The computing device 102 comprises a processor 104, a communication interface 108, a user interface 112, and a memory 116. A computing device according to other embodiments of the present disclosure may omit one or both of the communication interface 108 and the user interface 112.

The processor 104 of the computing device 102 may be any processor described herein or any similar processor. The processor 104 may be configured to execute instructions stored in the memory 116, which instructions may cause the processor 104 to carry out one or more computing steps utilizing or based on data received, for example, from the imaging device 132, the robot 136, the navigation system 144, the database 148, and/or the cloud 152.

The computing device 102 may also comprise a communication interface 108. The communication interface 108 may be used for receiving image data or other information from an external source (such as the imaging device 132, the robot 136, the navigation system 144, the database 148, the cloud 152, and/or a portable storage medium (e.g., a USB drive, a DVD, a CD)), and/or for transmitting instructions, images, or other information to an external system or device (e.g., another computing device 102, the imaging device 132, the robot 136, the navigation system 144, the database 148, the cloud 152, and/or a portable storage medium (e.g., a USB drive, a DVD, a CD)). The communication interface 108 may comprise one or more wired interfaces (e.g., a USB port, an ethernet port, a Firewire port) and/or one or more wireless interfaces (configured, for example, to transmit information via one or more wireless communication protocols such as 802.11a/b/g/n, Bluetooth, NFC, ZigBee, and so forth). In some embodiments, the communication interface 108 may be useful for enabling the device 102 to communicate with one or more other processors 104 or computing devices 102, whether to reduce the time needed to accomplish a computing-intensive task or for any other reason.

The user interface 112 may be or comprise a keyboard, mouse, trackball, monitor, television, touchscreen, button, joystick, switch, lever, and/or any other device for receiving information from a user and/or for providing information to a user of the computing device 102. The user interface 112 may be used, for example, to receive a user selection or other user input in connection with any step of any method described herein; to receive a user selection or other user input regarding one or more configurable settings of the computing device 102 and/or of another component of the system 100; to receive a user selection or other user input regarding how and/or where to store and/or transfer image data received, modified, and/or generated by the computing device 102; and/or to display an image to a user based on image data received, modified, and/or generated by the computing device 102. Notwithstanding the inclusion of the user interface 112 in the system 100, the system 100 may automatically (e.g., without any input via the user interface 112 or otherwise) carry out one or more, or all, of the steps of any method described herein.

Although the user interface 112 is shown as part of the computing device 102, in some embodiments, the computing device 102 may utilize a user interface 112 that is housed separately from one or more remaining components of the computing device 102. In some embodiments, the user interface 112 may be located proximate one or more other components of the computing device 102, while in other embodiments, the user interface 112 may be located remotely from one or more other components of the computer device 102.

The memory 116 may be or comprise RAM, DRAM, SDRAM, other solid-state memory, any memory described herein, or any other tangible non-transitory memory for storing computer-readable data and/or instructions. The memory 116 may store information or data useful for completing, for example, any step of the methods 200, 300, 400, 500, 600, 700, 800, and/or 900 described herein. The memory 116 may store, for example, one or more image processing algorithms 120, one or more predetermined criteria 124, and/or one or more vertebral endplate rim templates 128. Such instructions, algorithms, criteria, and/or templates may, in some embodiments, be organized into one or more applications, modules, packages, layers, or engines, and may cause the processor 104 to manipulate data stored in the memory 116 and/or received from another component of the system 100.

The image processing algorithms 120 may be or comprise, for example, one or more resampling algorithms, one or more blurring algorithms, one or more Laplacian filters, and/or one or more cropping algorithms. Other image processing algorithms 120 may also be stored within the memory 116.

The one or more predetermined criteria 124 may comprise one or more predetermined thresholds; one or more algorithms for detecting one or more characteristics in an image or portion thereof; one or more algorithms for measuring a distance (whether in voxels, pixels, metric units, standard units, or otherwise); one or more algorithms for comparing two or more voxels, pixels, or other items; or any other thresholds, algorithms, or data useful in connection with one or more predetermined criterion.

Each of the one or more vertebral endplate rim templates 128 may be or represent an expected appearance of a vertebral endplate rim. The template 128 may be specific to a particular vertebral level (e.g., the L2 level, the T7 level, the C3 level). Alternatively, the template 128 may be generic to a plurality of vertebral levels.

The imaging device 132 may be operable to image an anatomical feature of a patient, such as a spine or a portion of a spine of a patient. The imaging device 132 may be capable of taking a 2D image or a 3D image to yield the image data. "Image data" as used herein refers to the data generated or captured by an imaging device, including in a machine-readable form, a graphical form, and in any other form. In some embodiments, the imaging device 132 may be capable of taking a plurality of 2D images from a plurality of angles or points of view, and of generating a 3D image by combining or otherwise manipulating the plurality of 2D images. The imaging device 132 may be or comprise, for example, a CT scanner, an O-arm, a C-arm, a G-arm, another device utilizing X-ray-based imaging (e.g., a fluoroscope or other X-ray machine), an ultrasound probe, a magnetic resonance imaging (MM) scanner, an optical computed tomography scanner, an endoscope, a telescope, or any other imaging device suitable for obtaining images of an anatomical feature of a patient. In some embodiments, the system 100 may operate without the use of the imaging device 132.

The imaging device 132 may additionally or alternatively be operable to image the anatomical feature of the patient in real-time. In such embodiments, the imaging device 132 may continuously provide updated images and/or updated image data to the computing device 102, which may continuously process the updated images and/or updated image data to detect one or more vertebral endplate rims therein. In some embodiments, the imaging device 132 may comprise more than one imaging device 132. For example, a first imaging device may provide one or more preoperative images of an anatomical feature of a patient and a second imaging device may provide one or more intraoperative images of the anatomical feature of the patient during a surgical procedure. In other embodiments, the same imaging device may be used to provide only or both one or more preoperative images and one or more intraoperative images.

The robot 136 may be any surgical robot or surgical robotic system. The robot 136 may be or comprise, for example, the Mazor X™ Stealth Edition robotic guidance system. The robot 136 may comprise one or more robotic arms 140. In some embodiments, the robotic arm 140 may comprise a first robotic arm and a second robotic arm. In other embodiments, the robot 126 may comprise one robotic arm, two robotic arms, or more than two robotic arms. The robotic arm 140 may, in some embodiments, hold or otherwise support the imaging device 132. The robotic arm 140 may, in some embodiments, assist with a surgical procedure (e.g., by holding a tool in a desired trajectory or pose and/or supporting the weight of a tool while a surgeon or other user operates the tool, or otherwise) and/or automatically carry out a surgical procedure. In some embodiments, the system 100 may operate without the use of the robot 136.

In some embodiments, reference markers (i.e., navigation markers) may be placed on the robot 126, the robotic arm 140, the imaging device 132, or any other object in the surgical space. The reference markers may be tracked by the navigation system 144, and the results of the tracking may be used by the robot 126 and/or by an operator of the system 100 or any component thereof. In some embodiments, the navigation system 114 can be used to track other components of the system 100 (e.g., the imaging device 132) and the system can operate without the use of the robot 136 (e.g., with a surgeon manually manipulating the imaging device 132 and/or any tools useful for carrying out a surgical procedure).

The navigation system 144 may provide navigation for a surgeon and/or a surgical robot during an operation. The navigation system 144 may be any now-known or future-developed navigation system, including, for example, the Medtronic StealthStation™ S8 surgical navigation system. The navigation system 144 may include a camera or other sensor(s) for tracking one or more reference markers, navigated trackers, or other objects within an operating room or other room where a surgical procedure takes place. In various embodiments, the navigation system 144 may be used to track a position of the imaging device 132 (or, more particularly, of a navigated tracker attached, directly or indirectly, in fixed relation to the imaging device 132), and/or of the robot 136 (or one or more robotic arms 140 of the robot 136). The navigation system 144 may include a display for displaying one or more images from an external source (e.g., the computing device 102, imaging device 132, or other source) or a video stream from the camera or other sensor of the navigation system 144. In some embodiments, the system 100 may operate without the use of the navigation system 144.

The database 148 may store one or more images taken by one or more imaging devices 132 and may be configured to provide one or more such images (electronically, in the form of image data) to the computing device 102 (e.g., for display on or via a user interface 112) or to any other device, whether directly or via the cloud 152. In some embodiments, the database 148 may be or comprise part of a hospital image storage system, such as a picture archiving and communication system (PACS), a health information system (HIS), and/or another system for collecting, storing, managing, and/or transmitting electronic medical records including image data.

The cloud 152 may be or represent the Internet or any other wide area network. The computing device 102 may be connected to the cloud 152 via the communication interface 108, using a wired connection, a wireless connection, or both. In some embodiments, the computing device 102 may communicate with the database 148 and/or an external device (e.g., a computing device) via the cloud 152.

Figure 2:
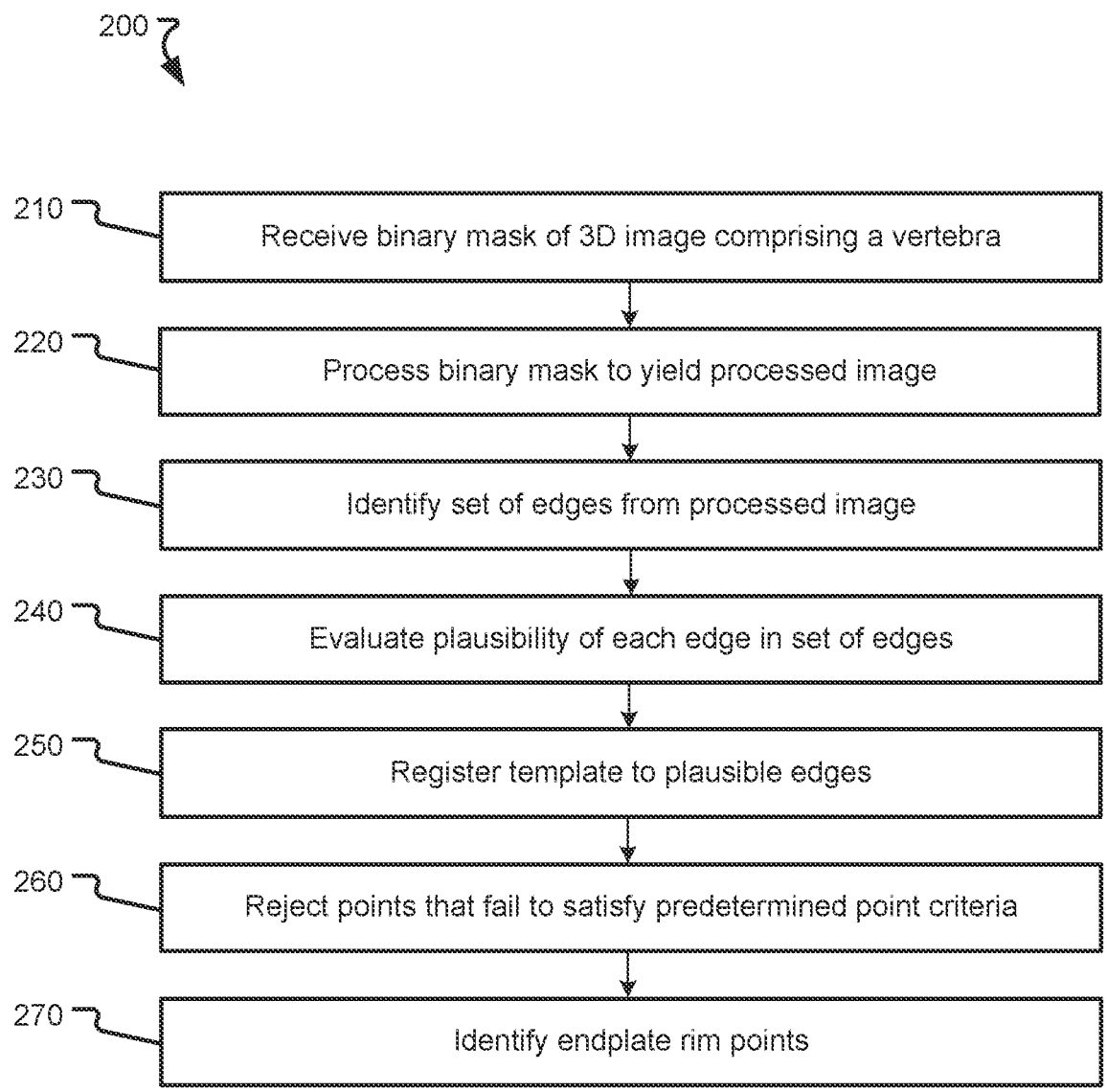
FIG. 2 is a flowchart of a method according to at least one embodiment of the present disclosure.

Turning now to FIG. 2, a method 200 for detecting vertebral endplate rims according to at least one embodiment of the present disclosure comprises receiving a binary mask of a 3D image comprising a vertebra (step 210). The binary mask may be the result of application of a binary filter to a 3D image of at least one vertebra. The binary mask may be received, for example, from the database 148, the cloud 152, or from the imaging device 132. The binary mask be received via the communication interface 108. In some embodiments, the binary mask may be received from the memory 116. For example, in some embodiments, a 3D image of at least one vertebra may be received from, for example, the database 148, the cloud 152, or the imaging device 132, and the processor 104 may apply an binary filter (which may be, for example, an image processing algorithm 120 stored in the memory 116) to the received image to yield a binary mask of the 3D image, which may be stored in the memory 116 until retrieved or otherwise received by the processor 104. In some embodiments, receiving the binary mask may comprise one or more of the steps of the method 300.

Although the step 210 is described above in connection with a binary mask of a 3D image, in some embodiments, the step 210 may comprise receiving a binary mask of a 2D image.

The method 200 also comprises processing the binary mask to yield a processed image (step 220). Any known image processing steps may be applied to the binary mask, including, for example, editing, filtering, transforming, and/or cropping. The processing steps may comprise or result in adjustment of noise, orientation, and/perspective. The processing steps may comprise resampling the binary mask to increase or decrease a number of pixels or voxels in the binary mask. The processed image that results from the processing of the binary mask may comprise one or more features that have been enhanced or diminished, emphasized or de-emphasized, or otherwise adjusted relative to the original binary mask. The processing may be carried out by the processor 104 applying one or more image processing algorithms 120 to the binary mask. In some embodiments, processing the binary mask to yield a processed image may comprise one or more of the steps of the method 400.

The method 200 also comprises identifying a set of edges in the processed image (step 230). The set of edges may be identified by applying one or more predetermined criteria 125 to the processed image. Each identified edge may be or comprise a point, a line, or a collection of adjacent points. The set of edges may be identified based on, for example, detecting changes of gradient direction in the processed image. In some embodiments, identifying the set of edges in the processed image may comprise one or more of the steps of the method 500.

The method 200 also comprises evaluating a plausibility of each edge in a set of edges (step 240). A plausible edge is an edge that is more likely to be an actual edge of an endplate rim of the vertebra in the processed image, while an implausible edge is an edge that is unlikely to be an actual edge of the endplate rim of the vertebra in the processed image. The evaluation may comprise identifying and rejecting implausible edges, and treating the remaining, non-rejected edges as plausible edges. In some embodiments, a rejected edge may be removed from the set of edges by deletion or otherwise, while in other embodiments, a rejected edge may be marked as such and/or ignored or otherwise not utilized in one or more subsequent steps of the method 200. Alternatively, the evaluation may comprise identifying plausible edges, and rejecting all edges not identified as plausible. In some embodiments, each edge may be separately evaluated against a set of plausibility criteria and against a set of implausibility criteria (which may be mutually exclusive from the plausibility criteria, so as to avoid satisfaction of both the plausibility and implausibility criteria by any one edge). In some embodiments, evaluating the plausibility of each edge in a set of edges may comprise one or more of the steps of the method 600.

The method 200 further comprises registering a template to the plausible edges (step 250). The template may be, for example, a template 128 stored in the memory 116. In some embodiments, the template may be received, for example, from the database 148 and/or from the cloud 152. The template may be selected based on one or more criteria, such as, for example, one or more patient characteristics (e.g., age, gender, body type), patient measurements (e.g., length of patient's spine), or any other criteria. The template may be obtained from or based on, for example, an anatomical atlas, and/or may reflect an average size and/or shape of a vertebral endplate rim. In some embodiments, registering a template to the plausible edges may comprise one or more of the steps of the method 700.

The method 200 also comprises rejecting points that fail to satisfy predetermined point criteria (step 260). The predetermined point criteria may be one or more of the predetermined criteria 124 stored in the memory 116. The predetermined point criteria may relate, for example, to a position of a point relative to a reference (e.g., another point(s), a line, a plane). The predetermined point criteria may relate to whether a given point is within a defined search region. The specific predetermined point criteria used for the step 260 may depend, for example, on whether the endplate rim being analyzed is a superior endplate rim (e.g., an endplate rim facing more toward the patient's head than the patient's feet)

or an inferior endplate rim (e.g., an endplate rim facing more toward the patient's feet than the patient's head).

The points may be points selected, for example, from the plausible edges identified during the method 200. Each plausible edge may correspond to one point, or each plausible edge may correspond to multiple points. In some embodiments, a rejected point may be removed from a list or group of points by deletion or otherwise, while in other embodiments, a rejected point may be marked as such and/or ignored or otherwise not utilized in the step 270. In some embodiments, rejecting points that fail to satisfy predetermined point criteria may comprise one or more of the steps of the method 800.

The method 200 further comprises identifying endplate rim points (step 270). The identifying may comprise using points remaining from the step 260 to define an interpolant, and then interpolating at regular intervals to obtain an evenly distributed collection of points on or very near the actual endplate rim of the vertebra in question. In some embodiments, the points may be correlated to a set of coordinates defining the endplate rim in any one or more of a patient space, a robotic space, or a navigation space. In some embodiments, identifying endplate rim points may comprise one or more of the steps of the method 900.

The present disclosure encompasses embodiments of the method 200 that comprise more or fewer steps than those described above. The present disclosure also encompasses embodiments of the method 200 that are used to automatically detect anatomical structures other than vertebral endplate rims.

Figure 3:
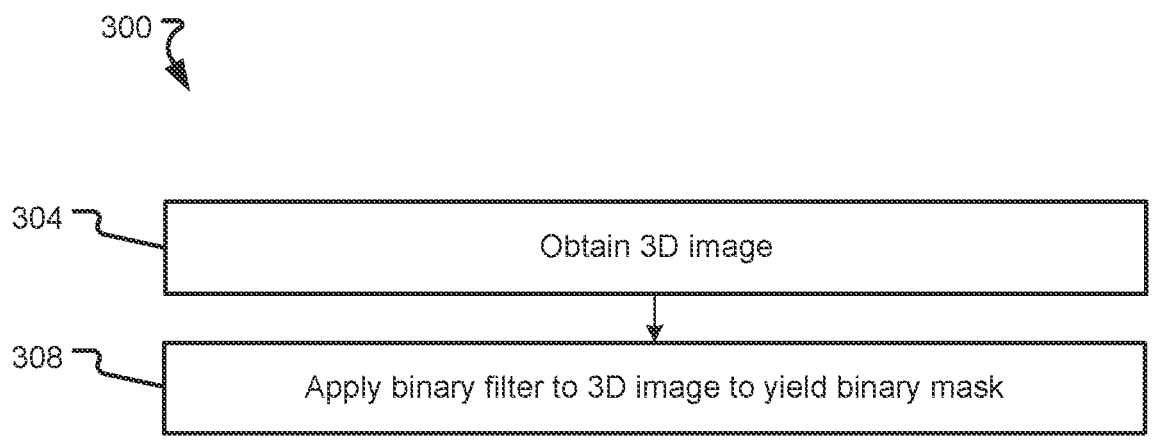
FIG. 3 is another flowchart of a method according to at least one embodiment of the present disclosure.

Turning now to FIG. 3, a method 300 for receiving a binary mask of a 3D image according to at least one embodiment of the present disclosure comprises obtaining a 3D image (step 304). The 3D image may be taken, for example, by an imaging device 132. The 3D image may be or result from a CT scan, an MM scan, an O-arm or other 360° scan, a combination of a plurality of 2D images, or any other source. The 3D image may be received by the computing device 102 directly from the imaging device 132, or from an image storage location such as the database 148. The 3D image may be received via the cloud 152. Regardless of the source of the 3D image, the 3D image may be received at the computing device 102 by the communication interface 108 and transferred to the processor 104 and/or to the memory 116. As a result, in some embodiments, the processor 104 may receive or obtain the 3D image from the memory 116.

The method 300 also comprises applying a binary filter to the 3D image to yield a binary mask (step 308). Application of the binary filter to the 3D image may yield a binary mask showing only a single vertebra (or other anatomical structure). The binary mask may comprise a plurality of points representing a single vertebra (or other anatomical structure). Each point may be or comprise, for example, a voxel in the 3D image. Some of the points may represent, for example, an endplate rim of the vertebra, while others of the points may represent other features of the vertebra (such as a side surface of the vertebra, or an endplate of the vertebra). The binary filter may be any known binary filter useful for yielding a binary mask, and in particular for yielding a binary mask in which a single vertebra is represented. The binary filter may be one of the image processing algorithms 120 stored in the memory 116. In some embodiments, the same binary filter may be used regardless of the type of the 3D image (e.g., CT scan, MRI scan, etc.), while in other embodiments, the binary filter used may depend on the image type. In some embodiments, the same binary filter may be used regardless of the specific vertebral level of the vertebra in question, while in other embodiments, the binary filter used may depend on the vertebral level of the vertebra in question.

Although described herein as a method for receiving a binary mask of a 3D image, in some embodiments of the present disclosure, the method 300 may be adapted to receive a binary mask of a 2D image. In such cases, the step 304 comprises obtaining a 2D image, and the step 308 comprises applying a binary filter to the 2D image to yield a binary mask.

The result of the method 300 is a binary mask useful for identifying a vertebral endplate rim of a vertebra (or other anatomical structure) represented in the binary mask, through further processing and analysis such as that described below in connection with the methods 400, 500, 600, 700, 800, and/or 900. The present disclosure encompasses embodiments of the method 300 with more or fewer steps than those described above.

Figure 4:
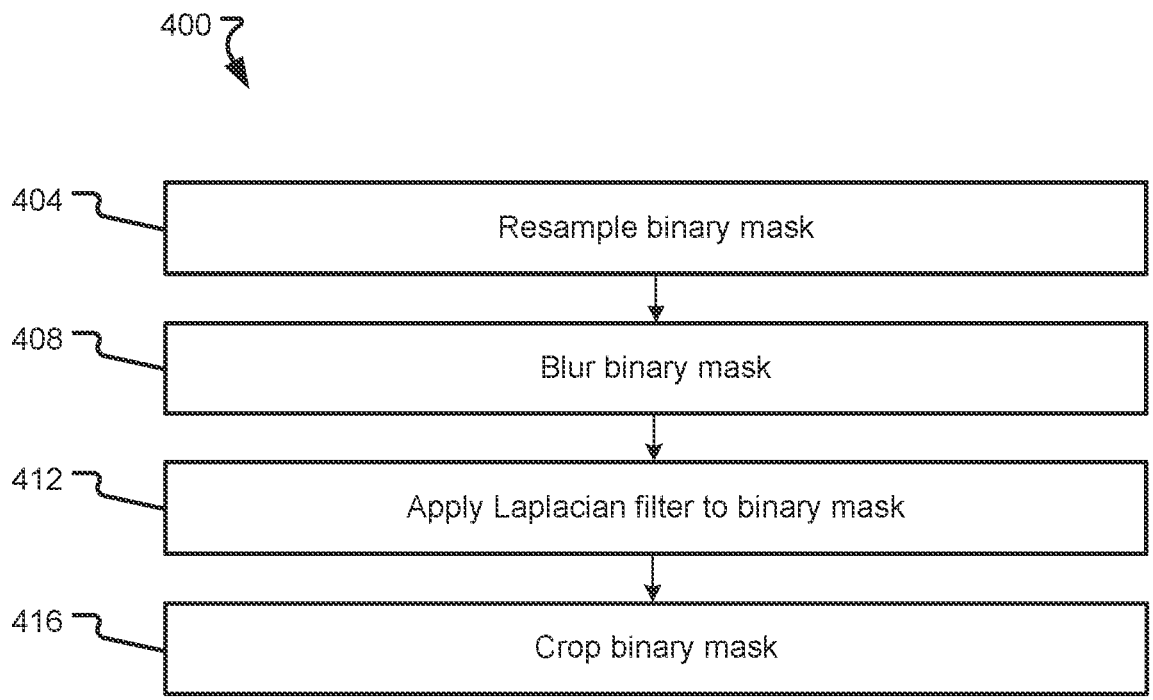
FIG. 4 is another flowchart of a method according to at least one embodiment of the present disclosure.

Turning now to FIG. 4, a method 400 for processing a binary mask according to at least one embodiment of the present disclosure comprises resampling a binary mask (step 404). The resampling may be effected by application of an image processing algorithm 120 stored in the memory 116 to the binary mask. The resampling may result in increasing or decreasing the number of voxels in the binary mask. For example, a resampling interval may be selected that will result in optimizing (whether by increasing or decreasing) the number of voxels in the binary mask to identify of an edge or rim between a first surface (e.g., a side of a vertebra) and a normal surface (e.g., an endplate of a vertebra) over a scale of about 3 mm, or about 2 mm, or about 1 mm. For example, for a scale of about 1 mm, the result of the resampling may be that each voxel in the binary mask has dimensions of 1 mm$^3$. As used herein, and unless otherwise specified, the terms "about" and "approximately" mean within 10% of the stated value. Any known resampling algorithm or process suitable for achieving the desired result of the resampling as explained herein may be applied to the binary mask.

The method 400 also comprises blurring the binary mask (step 408). The blurring may be effected by application of an image processing algorithm 120 stored in the memory 116 to the binary mask. The purpose of the blurring may be to remove outlier voxels from the binary mask The purpose of the blurring may be to further optimize the image for identification of an edge or rim between a first surface (e.g., a side of a vertebra) and a normal surface (e.g., an endplate of a vertebra) over a scale of about 3 mm, or about 2 mm, or about 1 mm. The kernel used for blurring may be selected based on the desired or selected scale. The blurring may be or comprise Gaussian smoothing or blurring, to prepare the binary mask for application of a Laplacian filter thereto. Any known blurring algorithm or process suitable for achieving one or more desired results of the blurring as explained herein may be applied to the binary mask.

The method 400 also comprises applying a Laplacian filter to the binary mask (step 412). Rather than looking at gradient of intensity, the methods described herein are concerned with changes in gradient direction, which may be identified using a Laplacian filter. The Laplacian filter may emphasize or otherwise enhance gradient changes in the binary mask, and thus facilitate detection of edges in the binary mask. The Laplacian filter may, for example, highlight regions of rapid intensity change in the binary mask. The Laplacian filter may be useful for indicating whether, at each location in the binary mask, a change in adjacent pixel values (within the binary mask) results from an edge. In some embodiments, blurring of the binary mask and application of a Laplacian filter to the binary mask may be combined into a single step, so as to reduce the number of steps required to process the binary mask. Any known Laplacian filter suitable for facilitating edge detection in the binary mask may be applied to the binary mask.

The method 400 also comprises cropping the binary mask (step 416). More specifically, the binary mask may be cropped to remove the posterior elements of the vertebra in question (e.g., the transverse processes, superior articular process, the inferior articular process, the spinous process, the lamina), which elements are not needed or useful for identifying the vertebral endplate rim. The cropping may be carried out using any known cropping algorithm suitable for such cropping.

The result of the method 400 is a processed binary mask useful for detecting a vertebral endplate rim of the vertebra (or other anatomical structure) represented in the processed binary mask. The processed binary mask may be used, for example, in one or more of the methods 500, 600, 700, 800, and/or 900. The present disclosure encompasses embodiments of the method 400 with more or fewer steps than those described above. For example, in some embodiments, the method 400 may further comprise application of an algorithm to the binary mask that results in holes in the interior of the binary mask being filled (thus removing any edges associated with such holes).

Figure 5:
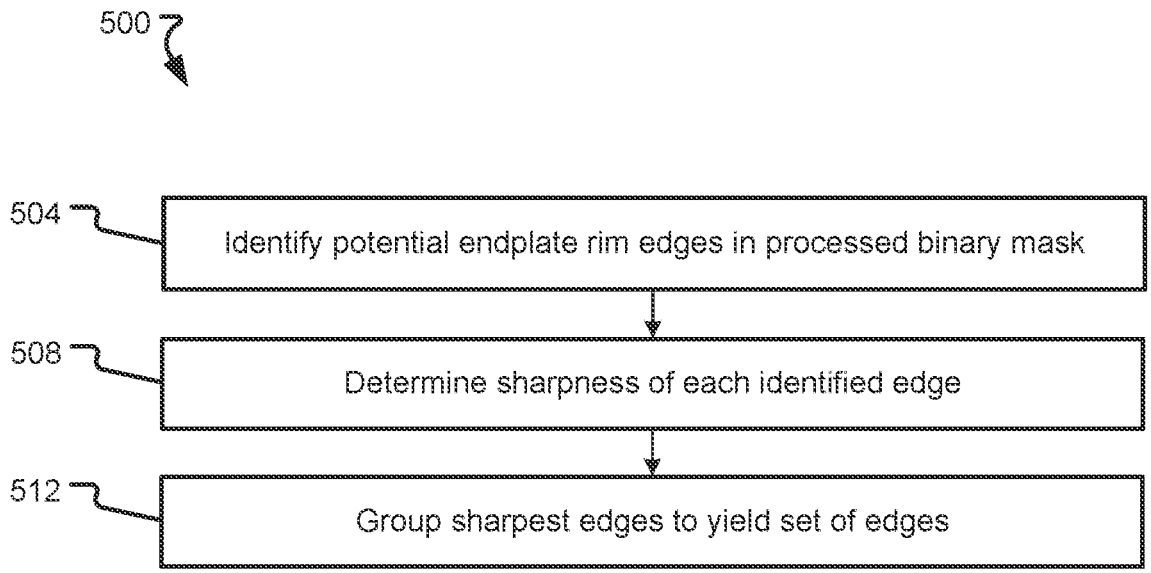
FIG. 5 is another flowchart of a method according to at least one embodiment of the present disclosure.

Turning now to FIG. 5, a method 500 for identifying a set of edges according to at least one embodiment of the present disclosure comprises identifying potential endplate rim edges in a processed binary mask (step 504). The endplate rim coincides with a sharp turn (e.g., within 1 mm) from an axial surface to a roughly orthogonal surface. This sharp turn results in an edge, and so one step in locating/identifying the endplate rim is to identify edges in the processed binary mask. Edges may be identified in any known manner. In particular, the results of applying a Laplacian filter to a binary mask (as described above in connection step 412 of the method 400) may be useful for identifying edges.

To avoid identifying false positives, or edges that cannot possibly be part of the vertebral endplate rim, identifying edges in the processed binary mask may comprise ignoring spurious edges, which may be formed by holes in the interior of the vertebral binary mask, and/or by portions of the binary mask representing boundaries of other volumes (e.g., volumes other than the vertebra in question). Such spurious edges may be removed by the resampling, blurring, and/or cropping steps 404, 408, and 416 of the method 400, or by one or more additional processing steps carried out as part of the method 200, the method 400, or the method 500.

More specifically, the resampling and blurring steps 404 and 408 of the method 400 enable edges resulting from spatial variations in the binary mask that are below a relevant length scale (e.g., spatial variations below a length scale of about 3 mm, or about 2 mm, or about 1 mm, that create edges not associated with the vertebral endplate rim) to be removed from the binary mask and thus ignored. Similarly, the cropping step 416 of the method 400 enables edges associated with elements of the vertebra other than the vertebral endplate to be removed from the binary mask and thus ignored. Where the steps 404, 408, and 416 of the method 400 have not been previously completed, one or more resampling, blurring, cropping, and/or other image processing operations may be performed on the binary mask during the present step.

The method 500 also comprises determining a sharpness of each identified edge (step 508). The sharpness of each identified edge may be a measure of an angle between two surfaces that meet to form the edge, or may be a measure of a rate of change of a gradient direction at the identified edge. The sharpness of each identified edge may already be reflected in the processed binary mask as a result of application of a Laplacian filter to the binary mask. In such embodiments, the sharpness of each identified edge may be represented by the value of the corresponding voxel(s) in the processed binary mask. Stated differently, while the fact that any given voxel in the processed binary mask has a non-zero value following application of a Laplacian filter to the binary mask may indicate that the voxel in question forms an edge, the magnitude of that value may reflect the sharpness of the edge. The determination of the sharpness of the edges may depend on the selected scale (e.g., about 3 mm, or about 2 mm, or about 1 mm).

The method 500 also comprises grouping the sharpest edges to yield a set of edges (step 512). The grouping may comprise determining a percentile ranking of each identified edge in terms of the determined sharpness of each edge. The sharpest edges may be those with rates of change of gradient direction (e.g., magnitudes of the values resulting from application of the Laplacian filter to the binary mask) that are higher than 99 percent, or 98 percent, or 97 percent, or 96 percent, or 90 percent, of all other rates of change of gradient direction in the binary mask (e.g., have Laplacian magnitudes in the $99^{th}$ percentile, the $98^{th}$ percentile, or the $97^{th}$ percentile, or the $96^{th}$ percentile, or the $90^{th}$ percentile).

Edges that meet the criteria for being the sharpest of all of the identified edges may be grouped in any suitable way for use during one or more steps of any one or more of the methods 600, 700, 800, and/or 900. For example, the sharpest edges may be added to or identified in a list, table, array, or other dataset. Additionally or alternatively, the sharpest edges may be highlighted, marked, or otherwise called out in an existing dataset comprising information about the edges identified in step 504.

The result of FIG. 5 is a set of edges that are potentially part of or otherwise associated with the vertebral endplate rim of the vertebra (or other anatomical structure) represented in the processed binary mask. The set of edges identified in FIG. 5 may be provided as an input to or otherwise used by one or more of the methods 600, 700, 800, and/or 900 for further processing and analysis. The present disclosure encompasses embodiments of the method 500 with more or fewer steps than those described above.

Figure 6:
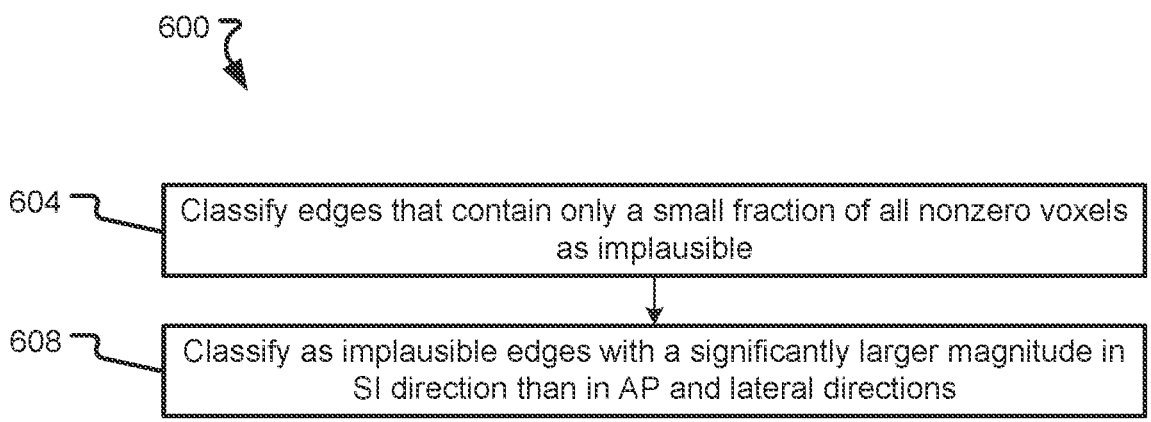
FIG. 6 is another flowchart of a method according to at least one embodiment of the present disclosure.

Turning now to FIG. 6, a method 600 for evaluating the plausibility of each edge in a set of edges according to at least one embodiment of the present disclosure comprises classifying edges that contain only a small fraction of all nonzero voxels as implausible (step 604). The classified edges may be one or more edges included in the set of edges identified in the method 500.

A vertebral endplate rim is a continuous edge surrounding the vertebral endplate. Edges that contain only a small fraction of all nonzero voxels (e.g., of voxels identified as edges) are unlikely to be part of this continuous edge (or may provide little useful information about the location of the vertebral endplate rim at the risk of providing misleading information), and therefore may be treated as implausible. Classifying an edge as implausible may comprise removing, from an existing dataset comprising information about edges in binary mask, any highlighting or marking of the edge (e.g., highlighting or marking that may have been added in step 512 of the method 500). Alternatively, classifying an edge as implausible may comprise further highlighting or marking the edge in such a dataset. In some embodiments, classifying an edge as implausible may comprise removing the edge from a list, table, array, or other dataset being used to track or otherwise identify edges that may correspond to a vertebral endplate rim.

The method 600 also comprises classifying as implausible edges with a significantly larger magnitude length or other physical dimension in a superior-inferior (SI) direction than in an anterior-posterior (AP) direction and in a lateral direction (step 608). Here again, the classified edges may be one or more edges included in the set of edges identified in the method 500. Vertebral endplate rims extend primarily in the AP and lateral directions (and/or a combination thereof). Any edge in the processed binary mask with a larger magnitude length or other physical dimension in the SI direction than in the AP and/or lateral directions is therefore unlikely to be or correspond to an actual edge of the vertebral endplate rim. In some embodiments, a predetermined threshold may be used for this determination. For example, any edge in the processed binary mask with a length or other physical dimension in the SI direction that is more than 1.5, or 2, or any other predetermined value, times the length or other physical dimension in the AP and/or lateral directions may be classified as implausible.

The result of the method 600 is a set of remaining edges, or edges that remain after excluding or otherwise omitting from consideration edges that are implausible (e.g., unlikely to be part of or otherwise associated with the actual vertebral endplate rim of the vertebra (or other anatomical structure) represented in the processed binary mask). The set of remaining edges may be used, for example, in one or more of the methods 700, 800, and/or 900. The present disclosure encompasses embodiments of the method 600 with more or fewer steps than those described above.

Figure 7:
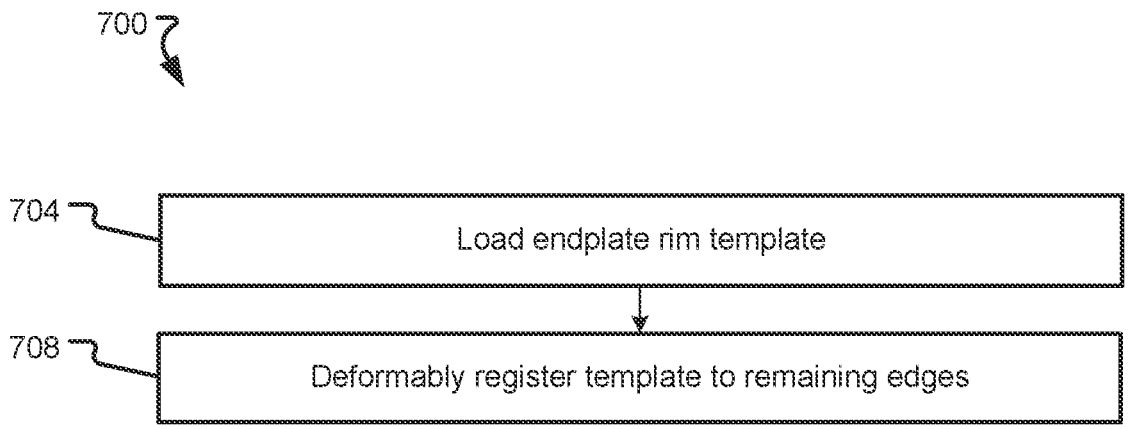
FIG. 7 is another flowchart of a method according to at least one embodiment of the present disclosure.

Turning now to FIG. 7, a method 700 for deformably registering a template according to at least one embodiment of the present disclosure loading an endplate rim template (step 704). The endplate rim template may be, for example, a template 128 stored in the memory 116, and may be loaded into a cache, random access memory, or other memory for storing data during manipulation of the same by the processor 104. In some embodiments, the memory 116 may be such memory. Also in some embodiments, the endplate rim template may be loaded from or via the database 148, the cloud 152, or another component of the system 100. Loading an endplate rim template may comprise selecting one of a plurality of templates to use. The selecting may be based on one or more patient characteristics (e.g. patient size, age, weight, gender), one or more vertebra characteristics (e.g. vertebra size, level), or any other information.

The method 700 also comprises deformably registering the endplate rim template to remaining edges (step 708). The remaining edges may be or comprise the set of remaining edges resulting from the method 600. The registration may comprise aligning centroids of the endplate rim template and of the vertebra represented in the processed binary mask, and then completing an affine registration. The registration may comprise use of one or more point set registration algorithms to match or correlate points on the endplate rim template to points on the remaining edges. For example, a point set registration algorithm useful for purposes of the present disclosure may be a robust registration algorithm, a maximum consensus algorithm, an outlier removal algorithm, an iterative closest point algorithm, a kernel correlation algorithm, or a coherent point drift algorithm.

The result of the method 700 is an initial approximation of the boundaries of a vertebral endplate rim (or other anatomical structure) represented in the processed binary mask, in the form of the registered template. One or more points of the registered template may still be implausible, but other points of the registered template align with the actual vertebral endplate rim of the vertebra (or other anatomical structure) in question. The registered template may be refined or otherwise used in one or more of the methods 800 and/or 900 to further identify or detect the vertebral endplate rim (or other anatomical structure). The present disclosure encompasses embodiments of the method 700 with more or fewer steps than those described above.

Figure 8:
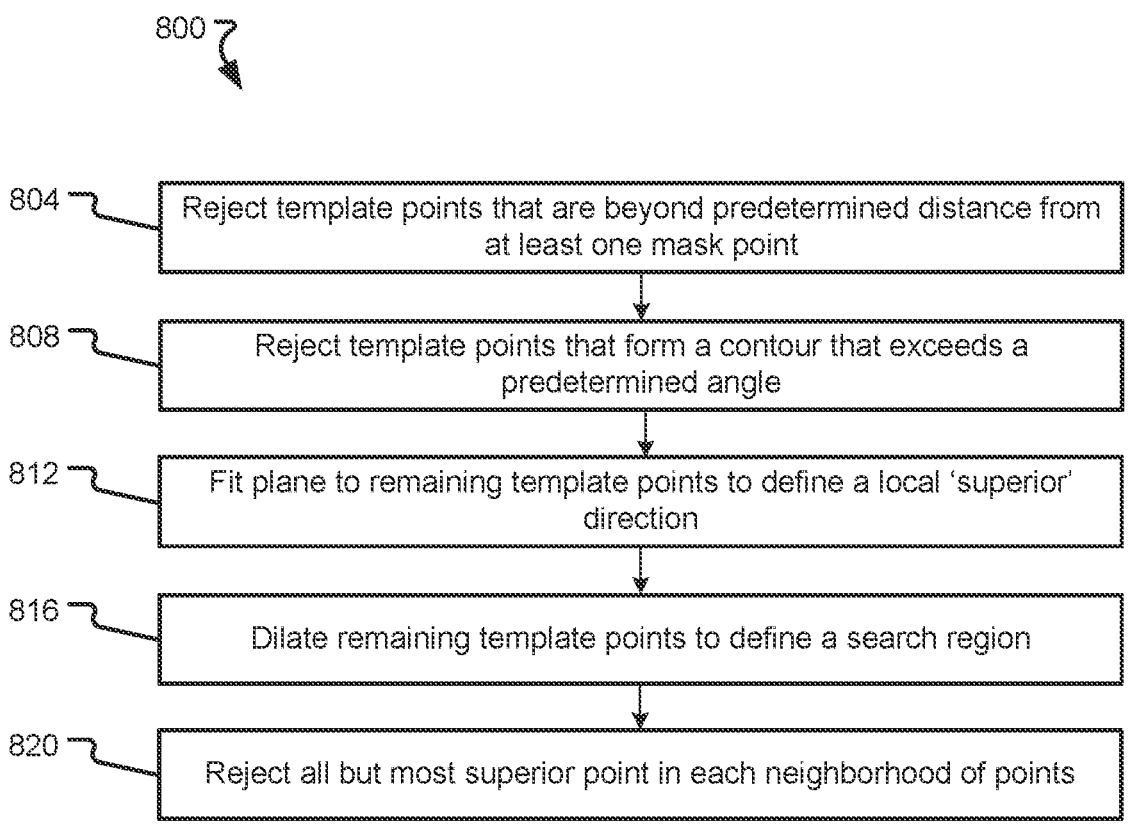
FIG. 8 is another flowchart of a method according to at least one embodiment of the present disclosure.

Turning now to FIG. 8, a method 800 for rejecting points that fail to satisfy predetermined point criteria according to at least one embodiment of the present disclosure comprises rejecting template points that are beyond a predetermined distance from at least one mask point (804). The template points may be, for example, points on a registered template resulting from the method 700. If any template point is farther than, for example, about 1 mm from a voxel representing the vertebra in the binary mask, then that point is unlikely to be an accurate representation of a point on the vertebral endplate rim and may be rejected. Rejection of a template point can mean or correspond to deletion of a constraint (e.g., identified coordinates corresponding to the point) through which the template must pass, or otherwise de-registering the template from the point.

The method 800 also comprises rejecting template points that form a contour that exceeds a predetermined angle (step 808). Because a vertebral endplate rim is a continuous, gently curved edge, any points along the registered template that form a rough contour (e.g., result in the template having an angle that exceeds, for example, about $3\pi/8$ radians, or about) 67.5°) may also be rejected.

The method 800 also comprises fitting a plane to the remaining template points to define a local "superior" direction (step 812). The plane may be fit to the remaining template points using a least squares method or any other method for identifying a best fit plane given a plurality of points in 3D space. Once the plane is fit to the points, a local "superior" direction may be defined. Thus, on one hand, if the vertebral endplate rim being detected is positioned on a superior side of the vertebra represented in the binary mask, then the local "superior" direction will correspond to the global superior direction for the patient, and the local inferior direction will correspond to the global inferior direction for the patient. The local "superior" direction will also reflect the vertebra's (or other anatomical structure's) tilt relative to the global SI direction or axis. Thus, if a vertebra is tilted 50 degrees away from the global SI direction or axis, the local "superior" and "inferior" directions will reflect a corresponding tilt. On the other hand, if the vertebral endplate rim being detected is positioned on an inferior side of the vertebra represented in the binary mask, then the local "superior" direction will correspond more closely to the global "inferior" direction (and have a tilt relative to the global "inferior" direction that corresponds to a tilt of the vertebra or other anatomical structure relative to the global SI direction or axis), and vice versa. For purposes of the remainder of the discussion of the method 800, references to "superior" and "inferior" are to be understood as referring to the local superior direction and the local inferior direction, respectively.

The method 800 also comprises dilating remaining template points to define a search region around each point (step 816). The dilation may use a scale factor of, for example, about 2, about 3, or about 4. The scale factor for a given point may be selected to result in a search region that extends halfway to an adjacent template point. The scale factor may be the same for every point, or may differ among or between points. Each search region beneficially encompasses any points in the original mask that are positioned within a volume surrounding the dilated template point, and any such points within the volume may be considered to comprise a neighborhood of points. Stated differently, each search region is the AND of volume encompassed by the dilated template point and the original binary mask, so as to ensure that any point selected from the search region is part of the vertebra (or other anatomical structure).

The method 800 also comprises rejecting all but the most superior point in each neighborhood of points, or in each search region (step 820). Rejecting all points in each search region but the most superior point beneficially ensures that only one point remains in each search region. Moreover, to the extent that step 804 has been completed prior to the step 820, the most superior point in each search region will still be a binary mask point. As a result, the set of most superior points is likely to be relatively homogenous in terms of position along the superior-inferior direction. Moreover, because the vertebral endplate rim extends along an upper edge of the vertebra (with no portion of the vertebra in the immediate vicinity of the rim positioned higher than the rim), the most superior point in each search region is the point that is most likely to lie along the actual vertebral endplate rim.

The result of the method 800 is a set of points that lie along the vertebral endplate rim of the vertebra (or other anatomical structure) represented in the processed binary mask. The set of points may be used, for example, in the method 900 or a similar method. The present disclosure encompasses embodiments of the method 800 with more or fewer steps than those described above.

Figure 9:
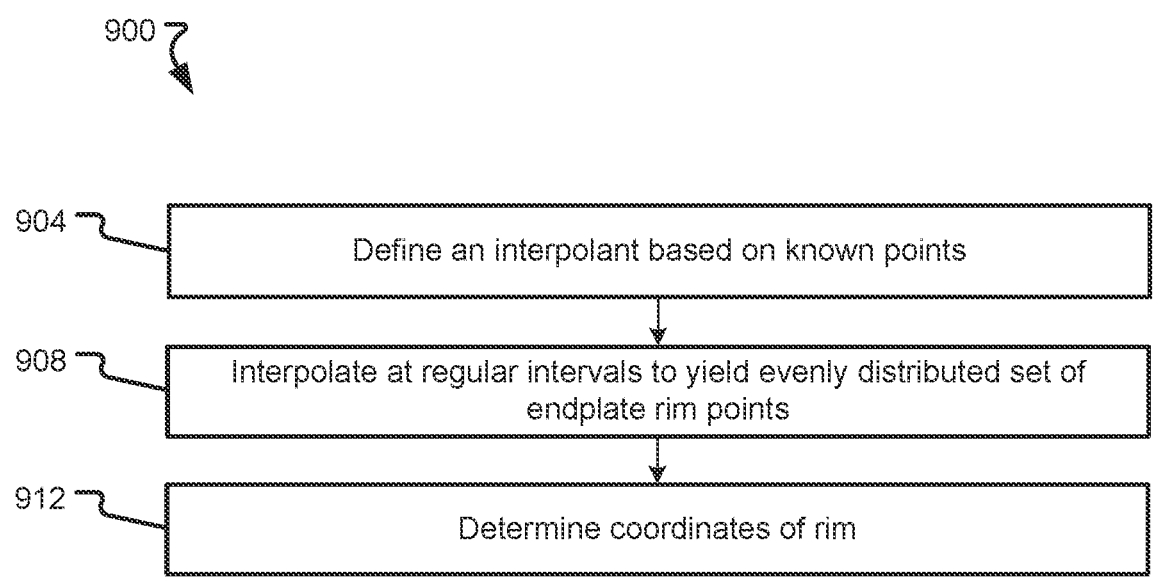
FIG. 9 is another flowchart of a method according to at least one embodiment of the present disclosure.

Turning now to FIG. 9, a method 900 for identifying endplate rim points according to at least one embodiment of the present disclosure comprises defining an interpolant based on known points (step 904). The interpolant may be based on the set of points that lie along the vertebral endplate rim of the vertebra represented in the processed binary mask, as identified by a method such as the method 800. The interpolant may be an algorithm that generates a curve that passes through each point of such a set of points. In some embodiments, only a single interpolant is used, while in other embodiments, more than one interpolant is used (e.g., for different quadrants or sections of the vertebral endplate rim).

The method 900 also comprises interpolating at regular intervals to yield an evenly distributed set of endplate rim points (step 908). One result of the point selection process described in the method 800, and/or of any individual step of the method 800, may be that one or more gaps exist in the definition of the vertebral endplate rim as represented by the points remaining after completion of the method 800 or any one or more steps thereof. Interpolation may therefore be used to fill such gaps. The interpolating may be accomplished using the interpolant defined in the step 904. Alternatively, the interpolating may be accomplished using a different interpolant suitable for interpolating at regular intervals to yield an evenly distributed set of endplate rim points. The evenly distributed set of endplate rim points may include both the set of points identified by a method such as the method 800, and points identified via interpolation. The evenly distributed set of points may comprise points spaced by an equal angular distance about a centroid of the set of points. Alternatively, each point in the evenly distributed set of points may be spaced by an equal or substantially equal linear distance.

The method 900 also comprises determining coordinates of the vertebral endplate rim (step 912). The determining coordinates may occur before or after an evenly distributed set of endplate rim points is obtained. Where the determining coordinates happens after an evenly distributed set of endplate rim points is obtained, the evenly distributed set of endplate rim points may be the points resulting from the step 908 or a similar step. The determining may comprise matching a centroid of the detected vertebral endplate rim in the processed binary mask to a centroid of the actual vertebral endplate in an image, and then utilizing one or more distance and/or position measurements from the binary mask (e.g., measurements of how far each point of the detected vertebral endplate rim lies from the centroid of the detected vertebral endplate rim, as well as of a position of each point of the detected vertebral endplate rim relative to the centroid of the detected vertebral endplate rim) to determine the precise coordinates in the image of each point of the vertebral endplate rim. In some embodiments, the determining may comprise applying one or more algorithms to convert a voxel space to a millimeter space. In some embodiments, the determining may utilize a registration of an image coordinate system to one or more of a patient coordinate system, a navigation coordinate system, a robotic coordinate system, or some other coordinate system to determine coordinate of the rim in the patient coordinate system, the navigation coordinate system, the robotic coordinate system, or the other coordinate system.

The result of the method 900 is a set of coordinates of the endplate rim (or other anatomical structure), detected using the binary mask, of the anatomical element represented in the binary mask. The coordinates may be used for any number of purposes, particularly when multiple endplate rims have been detected according to one or more methods of the present disclosure. For example, coordinates of the detected vertebral endplate rim(s) may be used to automatically measure disc height and/or Cobb angles; for segmental tracking; for surgical planning; and/or to shortcut one or more steps of a registration process (e.g., to automatically identify a starting point to use for an automated registration process).

Detection of vertebral endplate rims or other anatomical structures as described herein may be completed based on a preoperative image and/or based on an intraoperative image. In some embodiments, the detection may be completed intraoperatively, and the results may be used intraoperatively for registration and/or segmental tracking. In some embodiments, the initial detection of the vertebral endplate rim(s) may be carried out using a preoperative CT or other 3D image, while one or more intraoperative 2D images may be used to update the coordinates of the detected vertebral endplate rim during a surgical procedure and/or to detect (in two-dimensional space) the vertebral endplate rim after some movement of the corresponding vertebra or other surgical or anatomical event.

The present disclosure encompasses embodiments of the method 900 with more or fewer steps than those described above.

Any of the method steps described herein that comprise application of a predetermined threshold or other predetermined criteria may be applied or carried out in iterative fashion, with each iteration applying a slightly different predetermined threshold or other predetermined criteria until the result is satisfactory to a user.

Figure 10C:
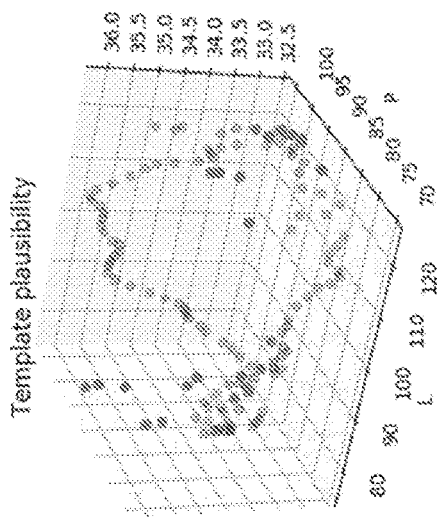
FIG. 10C is an image showing a possible outcome of another step of a method according to at least one embodiment of the present disclosure.
Figure 10F:
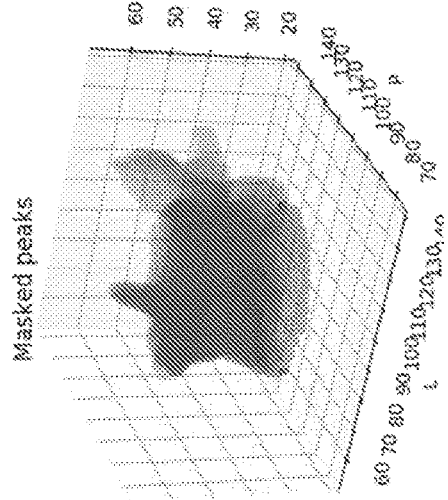
FIG. 10F is an image showing a possible outcome of another step of a method according to at least one embodiment of the present disclosure.
Figure 10B:
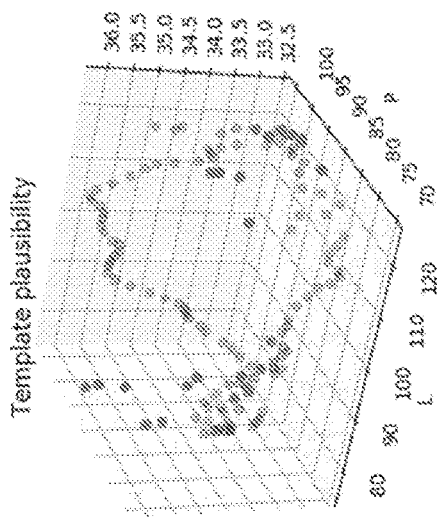
FIG. 10B is an image showing a possible outcome of another step of a method according to at least one embodiment of the present disclosure.
Figure 10E:
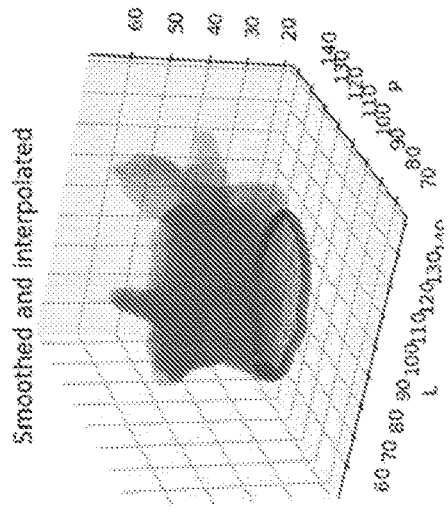
FIG. 10E is an image showing a possible outcome of another step of a method according to at least one embodiment of the present disclosure.
Figure 10A:
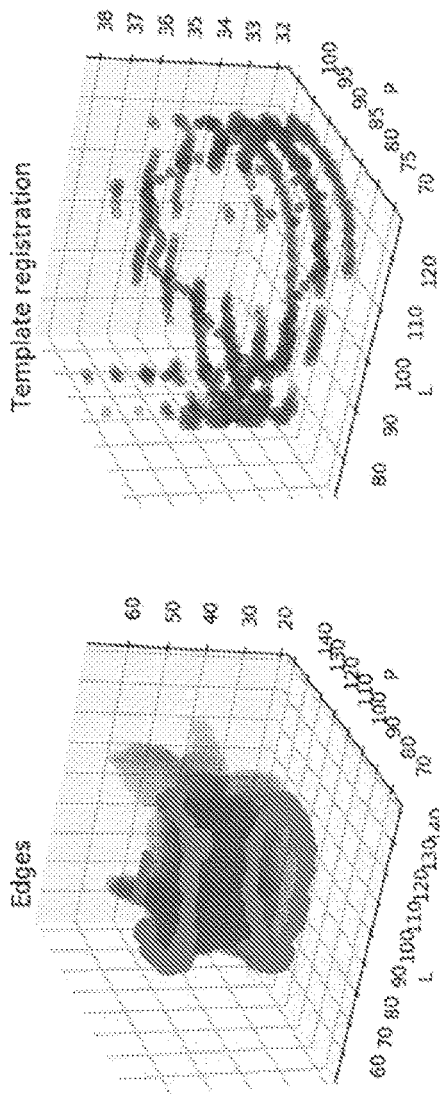
FIG. 10A is an image showing a possible outcome of one step of a method according to at least one embodiment of the present disclosure.

Turning now to FIGS. 10A-10F, various steps of the methods described herein are illustrated. FIG. 10A illustrates a processed binary mask of a vertebra with points corresponding to an initial set of detected edges highlighted. A model such as that shown in FIG. 10A may result, for example, from the step 230 of the method 200, and/or from the step 504 of the method 500.

FIG. 10B illustrates an inferior side of a processed binary mask of a vertebra showing points to which a template has been registered. A model such as that shown in FIG. 10B may result from or be generated during, for example, the step 250 of the method 200, and/or the step 708 of the method 700.

FIG. 10C illustrates points of a processed binary mask of a vertebra in which implausible points to which the template has been registered are highlighted. A model such as that shown in FIG. 10C may result from or be generating during, for example, the step 260 of the method 200, and/or one or both of steps 804 and/or 808 of the method 800.

Figure 10D:
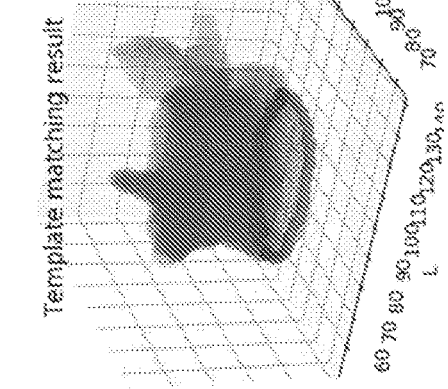
FIG. 10D is an image showing a possible outcome of another step of a method according to at least one embodiment of the present disclosure.

FIG. 10D illustrates a processed binary mask of a vertebra in which the results of a template matching process are highlighted. A model such as that shown in FIG. 10D may result from or be generated during, for example, the step 260 of the method 200, and/or the step 808 of the method 800.

FIG. 10E illustrates a processed binary mask in which masked peaks (e.g., peaks in the template masked by a fitted plane) have been highlighted. A model such as that shown in FIG. 10E may result from or be generated during, for example, the step 260 of the method 200, and/or from any the step 820 of the method 800.

FIG. 10F illustrates a processed binary mask of a vertebra in which an inferior endplate rim of the vertebra has been detected according to one or more methods of the present disclosure. A model such as that shown in FIG. 10F may result, for example, from the step 270 of the method 200, and/or from the step 908 of the method 900.

Figure 11:
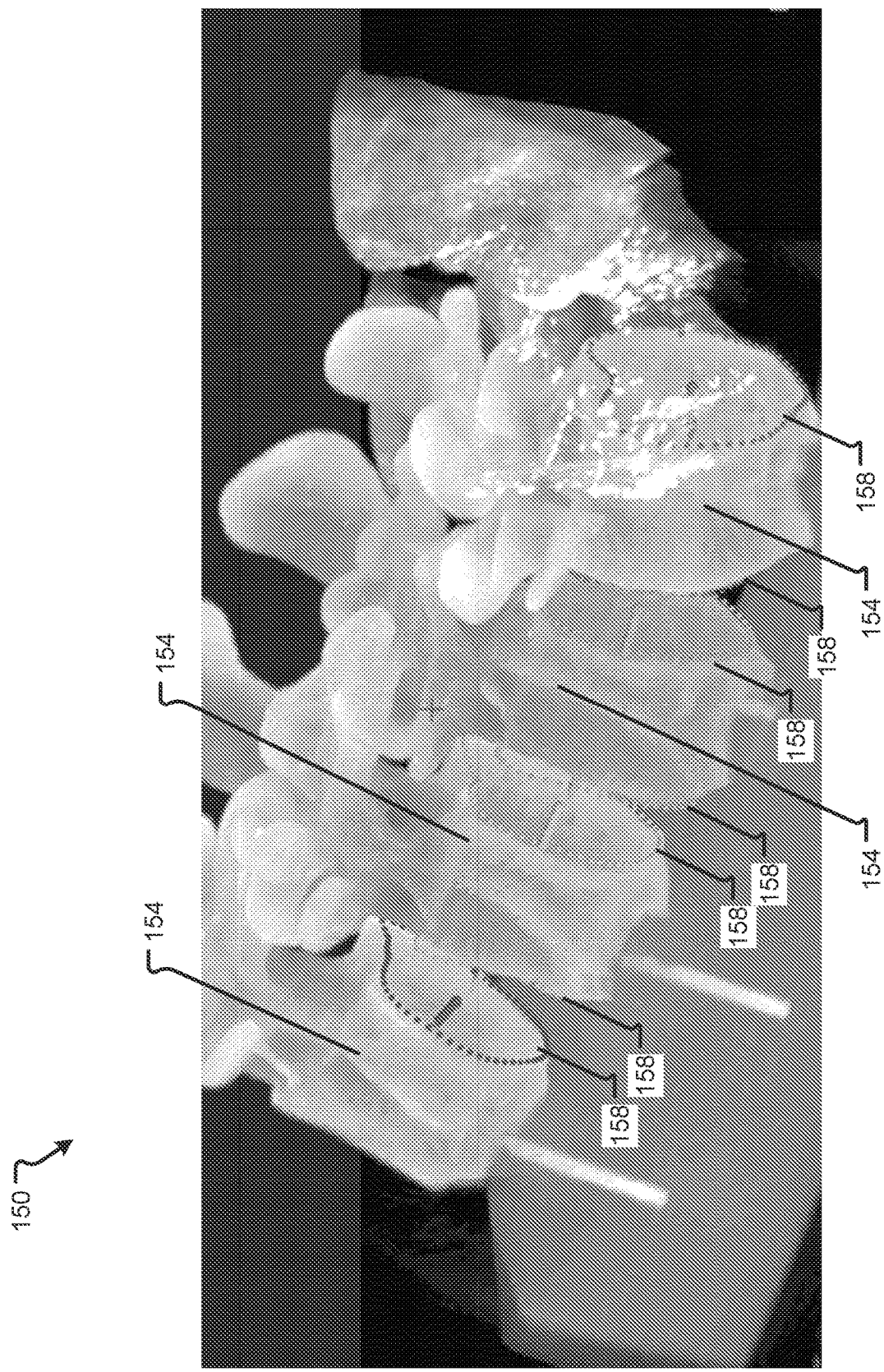
FIG. 11 is an image showing a possible result of a method according to at least one embodiment of the present disclosure.

FIG. 11 illustrates one potential use case of the results of the methods described herein. More specifically, FIG. 11 shows a representative 2D snapshot 150 of a 3D image of a portion of a patient's spine, such as might be obtained preoperatively using, for example, a CT scanner, or intraoperatively using, for example, an O-arm. The snapshot 150 shows four vertebrae 154 of the spine. Superimposed over the vertebrae 154 are sets of points identifying visible endplate rims 158 in the snapshot 150, which sets of points were obtained using the methods of the present disclosure. As described above, automatic detection of the endplate rims 158 as described herein may beneficially be useful for and/or in connection with measuring Cobb angles and intravertebral disc height; for surgical planning; for registration prior to or during a surgical procedure; and/or for segmental tracking during a procedure.

As may be appreciated based on the foregoing disclosure, the present disclosure encompasses methods with fewer than all of the steps identified in FIGS. 2-9 (and the corresponding description of the methods 200, 300, 400, 500, 600, 700, 800, and 900), as well as methods that include additional steps beyond those identified in FIGS. 2-9 (and the corresponding description of the methods 200, 300, 400, 500, 600, 700, 800, and 900). Moreover, in some embodiments of the present disclosure, only a subset of the methods 200, 300, 400, 500, 600, 700, 800, and 900 may be used (including only one of such methods), with in other embodiments, every one of the methods 200, 300, 400, 500, 600, 700, 800, and 900 may be used.

Any reference to a voxel herein should be understood as applicable to 3D images, and the term "voxel" may be replaced by the term "pixel" for applications of the foregoing disclosure to 2D images.

The foregoing discussion has been presented for purposes of illustration and description. Based on the disclosure here and the examples provided, including with respect to automatic detection of a vertebral endplate rim, persons of ordinary skill in the art will understand how to utilize the systems and methods of the present disclosure to automatically detect other anatomical structures.

The foregoing is not intended to limit the disclosure to the form or forms disclosed herein. In the foregoing Detailed Description, for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the description has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A system for identifying vertebral endplate rims, comprising:
    a communication interface;
    at least one processor; and
    a memory storing instructions for execution by the at least one processor that, when executed, cause the at least one processor to:
        receive a binary mask of a 3D image of a vertebra;
        identify a set of edges of the vertebra based on a determined change of gradient direction;
        categorize each edge of the set of edges as a plausible edge or an implausible edge;
        reject the implausible edges;
        select a plurality of points based on the plausible edges; and
        generate additional points by interpolating between adjacent ones of at least some of the plurality of points to fill gaps between the at least some of the plurality of points.

2. The system of claim 1, wherein the memory stores additional instructions for execution by the at least one processor that, when executed, cause the at least one processor to output coordinates of a vertebral endplate rim.

3. The system of claim 1, wherein the memory stores additional instructions for execution by the at least one processor that, when executed, cause the at least one processor to fit a template to the set of edges.

4. The system of claim 3, wherein categorizing each edge of the set of edges comprises comparing a location of each of a plurality of fitted points on the template to at least two adjacent fitted points on the template.

5. The system of claim 4, wherein categorizing each edge of the set of edges comprises categorizing any edge that extends more than a predetermined distance from the template as implausible.

6. The system of claim 1, wherein identifying the set of edges comprises applying a Laplacian filter to the binary mask.

7. The system of claim 1, wherein identifying the set of edges comprises identifying changes of gradient direction that exceed a predetermined magnitude.

8. The system of claim 1, wherein the implausible edges are those with a length in a superior-inferior direction that is greater by at least a predetermined amount than each of a length in an anterior-posterior direction and a length in a lateral direction.

9. The system of claim 1, wherein the additional points are generated by interpolating at regular intervals.

10. The system of claim 1, wherein the memory stores additional instructions for execution by the at least one processor that, when executed, cause the at least one processor to:
exclude some of the plurality of points based on at least one predetermined criterion.

11. A method of detecting a vertebral endplate rim, comprising:
receiving, at a processor, a binary mask of a vertebra;
applying a Laplacian filter to the binary mask to yield a processed image;
identifying, in the processed image, a set of edges having a sharpness that exceeds a predetermined threshold;
deformably registering a template to a plurality of points corresponding to at least some of the edges in the set of edges;
excluding some of the plurality of points based on at least one predetermined criterion; and
generating additional points by interpolating among a remaining subset of the plurality of points to yield a set of points defining an endplate rim of the vertebra.

12. The method of claim 11, wherein the at least one predetermined criterion comprises whether a point from the plurality of points is beyond a predetermined distance from a subset of the plurality of points.

13. The method of claim 11, wherein the at least one predetermined criterion comprises whether a point from the plurality of points defines a contour that exceeds a predetermined sharpness.

14. The method of claim 11, wherein the at least one predetermined criterion comprises whether a point from the plurality of points is closer to a plane fitted to the template than an adjacent point.

15. The method of claim 11, wherein each of the at least some of the edges in the set of edges satisfy an edge criterion.

16. The method of claim 15, wherein the edge criterion corresponds to a dimension of an edge in a superior-inferior direction relative to each of a dimension of the edge in an anterior-posterior direction and a dimension of the edge in a lateral direction.

17. An image processing device, comprising:
a communication interface;
at least one processor; and
a memory storing instructions for execution by the at least one processor that, when executed, cause the at least one processor to:
apply a Laplacian filter to a binary mask of a vertebra to yield a processed image, the binary mask received via the communication interface;
identify a set of plausible edges using the processed image;
register a template to a plurality of points, each of the plurality of points located on at least one plausible edge of the set of plausible edges;
apply a predetermined criterion to each point of the plurality of points to yield a rejected set comprising points that do not satisfy the predetermined criterion and an accepted set comprising points that do satisfy the predetermined criterion; and
generate at least one new point by interpolating between at least two points of the accepted set.

18. The image processing device of claim 17, wherein the memory stores additional instructions for execution by the at least one processor that, when executed, further cause the at least one processor to determine coordinates of an endplate rim of the vertebra based on at least the accepted set.

19. The image processing device of claim 17, wherein the at least one processor does not use a machine learning algorithm in connection with any of the instructions.

20. The image processing device of claim 17, wherein each of the instructions is executed by the at least one processor automatically.

21. The image processing device of claim 17, wherein the memory stores additional instructions for execution by the at least one processor that, when executed, further cause the at least one processor to fit a plane to the registered template, and further wherein the predetermined criterion is based on the fitted plane.

* * * * *